Jan. 24, 1950     F. L. THOMASON     2,495,300
LUBRICATION APPARATUS FOR TWISTER RINGS
Filed Aug. 21, 1948     2 Sheets-Sheet 1
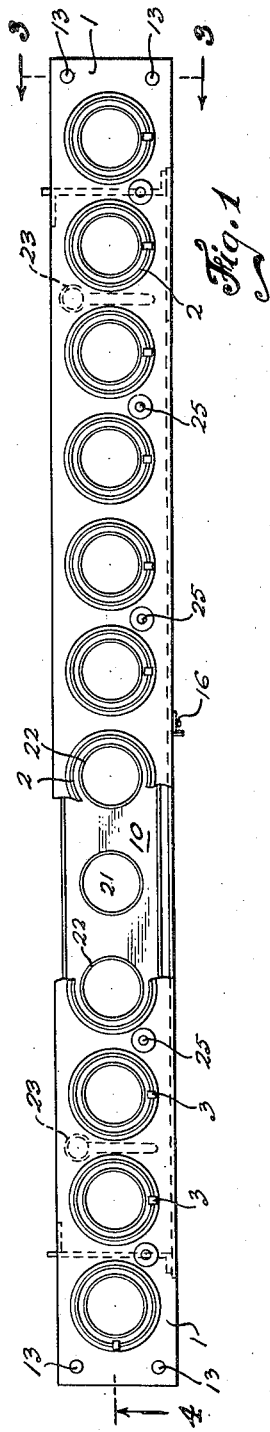
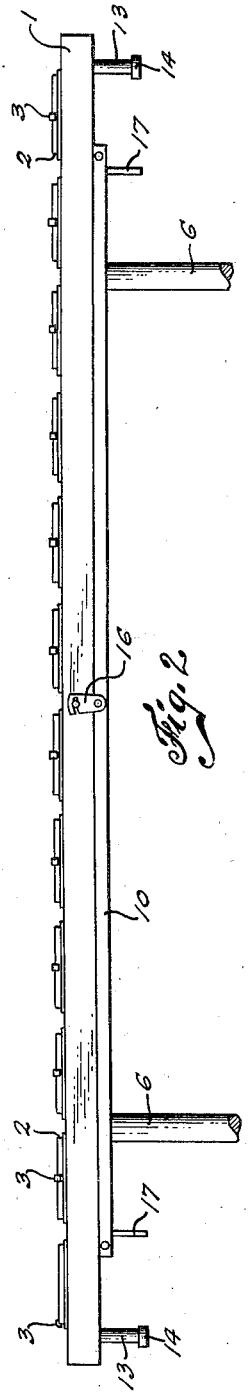
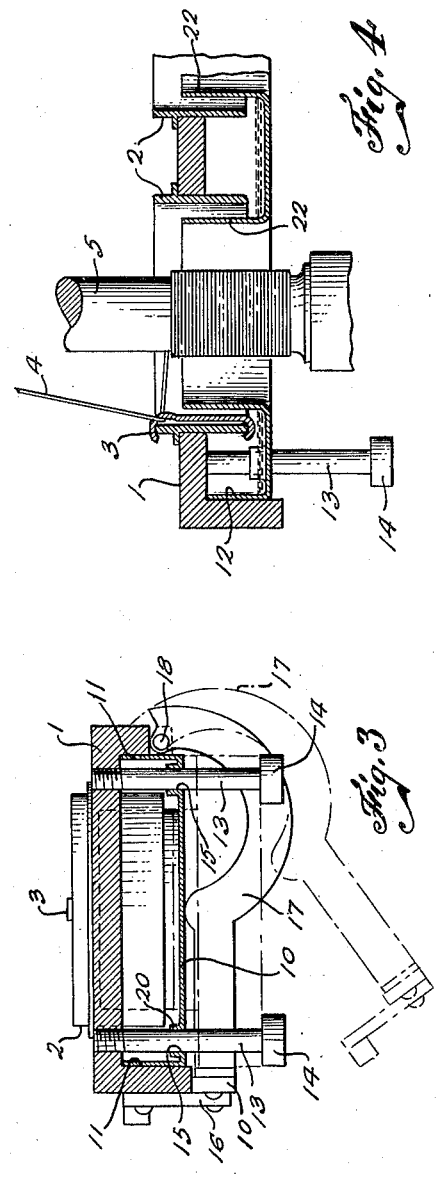
INVENTOR
FALLS. L. THOMASON
BY
ATTORNEYS

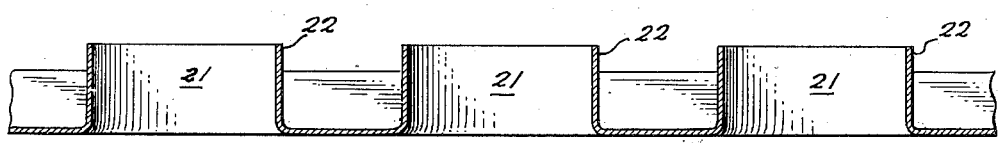
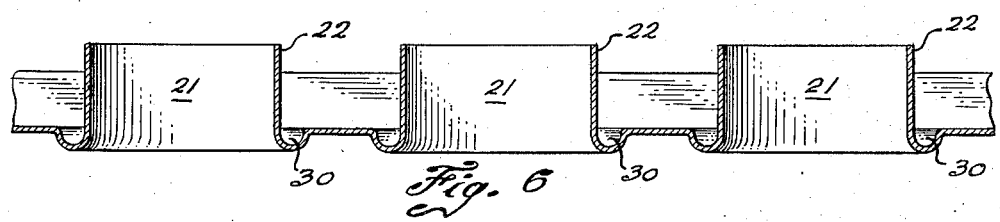
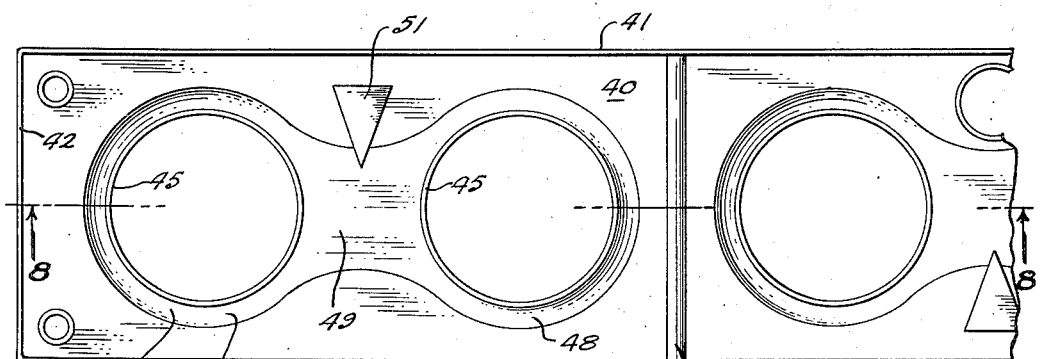
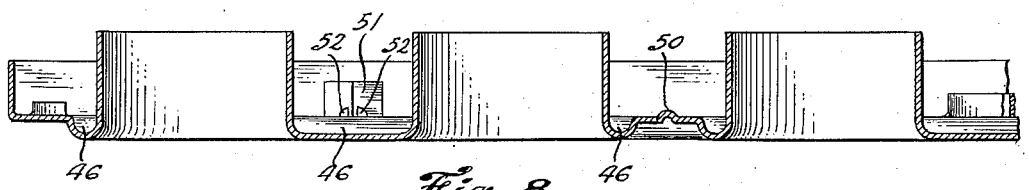

Patented Jan. 24, 1950

2,495,300

UNITED STATES PATENT OFFICE 2,495,300

LUBRICATION APPARATUS FOR TWISTER RINGS

Falls L. Thomason, Charlotte, N. C.

Application August 21, 1948, Serial No. 45,450

6 Claims. (Cl. 184—7)

This invention relates to improvements in lubrication apparatus for twister rings and more especially to twister rings employed in twister frames and the means for lubricating the rings of travelers.

In my previous application, Serial No. 677,997, filed June 20, 1946, now Patent No. 2,447,548, for Lubrication apparatus for twister rings, I have disclosed a lubrication apparatus in which a member carrying a plurality of oil wells for lubricating a corresponding plurality of twister rings is provided and means for conveniently positioning the parts in operating relation, separating them as required and supplying lubricant are provided. The present invention constitutes an improvement on the apparatus disclosed in my said application.

It is an object of the invention to provide a lubrication apparatus of the type indicated which is of simple construction and adapted to mass production by sheet metal fabrication.

Another object of the invention is to provide a lubrication apparatus having improved provision for maintaining a supply of lubricant.

With the foregoing and other objects which will appear in the following description in mind, the invention consists in the combinations and arrangements of parts and details of construction which will now first be fully described with reference to the accompanying drawing and then be more particularly pointed out in the appended claims.

In the drawing:

Figure 1 is a top plan view of the section of a ring rail for a twister frame, showing part of the same as broken away to reveal the subjacent structure;

Figure 2 is a side elevation of the mechanism shown in Figure 1;

Figure 3 is a cross section on the line 3—3 of Figure 1;

Figure 4 is a longitudinal section on the line 4—4 of Figure 1;

Figure 5 is a central longitudinal section of a lubricating tray forming part of the device of Figure 1;

Figure 6 is a view similar to Figure 5, showing a modified form of lubricating tray;

Figure 7 is a plan view of still another modified form of tray; and

Figure 8 is a section on the line 8—8 of Figure 7.

As shown in Figures 1 to 4, the ring rail section 1 for a twister frame or the like, is in the form of a flat plate having side and end flanges as indicated, and is generally of conventional form. A number of such ring rail sections may be secured to each other in end to end relation in any suitable relation for the entire length of the twister frame. Each section, as shown in Figure 1, carries a number of rings 2 mounted in suitable openings as indicated, each ring 2 carrying a traveler 3 which guides the yarn 4 to be wound onto a bobbin or package 5 which is rotatably mounted centrally of ring 2, as usual, and as indicated in Figure 4.

The ring rail is moved upwardly and downwardly relative to the bobbins 5 by means of suitable lifter rods 6 secured to the rail in any convenient manner. A lubricating tray 10 is provided. Tray 10 is generally flat but has upturned side flanges 11 and end flanges 12 forming an enclosure with the twister frame against lint and dust and also forming a lubricant well.

Studs 13 having enlarged heads 14 pass through apertures 15 in the lubricating tray 10 and are secured as by means of threaded connections to the ring rail 1. These studs serve to guide the tray 10 when it is moved toward and away from the ring rail 1. The tray may be held up in operating position as by means of a catch 16 or may be dropped into a lower position, indicated in phantom in Figure 3, to furnish access to the parts for any required purpose. An operating member 17 pivoted to the ring rail at 18 and carrying catch 16 may be provided for raising and lowering the tray. In the lowered or separated position, as indicated in phantom in Figure 3, the tray rests upon the enlarged heads 14 of the studs 13.

Each aperture 15 is surrounded by an upwardly extending collar or circular flange 20 which prevents loss of lubricant through the aperture 15. For accommodating the spindles 5, tray 10 is formed with apertures 21 surrounded by circular walls 22 which extend into the rings 2 of the ring rail 1, as indicated. The walls 22 serve to prevent loss of lubricant through the openings 21 and also serve as guards.

The lifter rods 6 are accommodated by apertures 23 in the lubricating tray 10 (Fig. 1), loss of lubricant being prevented, as in the case of the apertures 15, by collars (not shown) surrounding the apertures 23. One or more openings 25 in the ring rail 1 may be provided for introducing lubricant into the tray 10. The lubricating device shown has a number of advantages. It may be formed of sheet metal by inexpensive stamping and drawing operations and may be very light. Since the whole area of the tray, apart from the necessary openings therethrough, is available for holding lubricant, it will be apparent that the change in level of the lubricant in the tray, for a given quantity of lubricant consumed, will be reduced to a minimum, so that variation in lubricant level with a given frequency of filling may be held to a minimum, or the interval between additions of lubricant may be enlarged by comparison with prior devices.

The side and end flanges of the tray may be in contact or substantially in contact with the ring rail when in operating position, and the flanges or wall 22 surrounding the bobbin and extending up into the rings may be of such diameter as to leave only the necessary clearance for the travelers. In this way a practically complete enclosure may be formed.

The lubricant tray of Figures 1 to 5 may be modified by forming depressed annular wells at the base of each of the walls or collars 22. Such a modification is illustrated in Figure 6, an annular well 30 being provided around each of the walls 22.

A further modification of the lubricating tray is illustrated in Figures 7 and 8. The lubricating tray 40 is surrounded by upstanding side flanges 41 and end flanges 42 and has accommodations for the guide studs 13 and lifter rods 6, all as described with reference to the lubricating tray 10 of earlier figures. The collars or walls 45 are located and shaped similarly to the collars or walls 22 previously described, but the metal around each pair of adjacent walls 45 is deformed to form an hour-glass or figure 8 shaped depression or well 46 for holding a supply of lubricant. This depression comprises an annular portion 48, similar to the depression 30 of Figure 6, surrounding each wall 45 and a neck or central depression 49 connecting portions 48, so that two adjacent rings may be lubricated simultaneously and lubricant may flow from the lubricating well for one to that for the other. Each such pair of ring lubricating wells may be separated from adjacent wells by means of a rib 50 struck up from the bottom of the tray and extending transversely thereof. Any desired form of liquid or semi-solid lubricant may be used in the tray of Figures 7 and 8. In particular packaged lubricants of known and available types may be employed. As illustrated, each pair of lubricant wells is supplied from a container 51 of triangular form having openings 52 for permitting flow of lubricant into the wells. Each container 51 may be filled with lubricant having a definite melting point so that the supply of lubricant is closely controlled and the type of lubricant used may be changed according to prevailing temperature conditions in the plant at the particular season of the year.

Any of the trays described above may be supplied with lubricant, if preferred, at a single location adjacent the middle or adjacent an end of the tray, the flow of lubricant serving to distribute it over the tray. Where installation conditions are such that the tray may not be perfectly horizontal, the construction of Figure 6 will be found preferable to that of Figure 5 and the construction of Figures 7 and 8 will be still more advantageous. In the construction of Figures 7 and 8, the ribs 50 serve to retain lubricant for each adjacent pair of twister rings and prevent flow thereof to the end of the lubricating tray.

In all the embodiments disclosed, the lubricating tray may be formed of sheet metal by economical stamping and drawing operations, thus producing a light weight leak proof element which is well adapted to economical mass production methods.

What is claimed is:

1. Apparatus for lubricating the rings and travelers in a twister frame or the like comprising the combination with a ring rail of a tray positioned below the same, the tray having upwardly extending side and end flanges and guard flanges extending upwardly into the rings, the floor of the tray and the said flanges defining a well for holding a supply of lubricant for lubricating a plurality of rings.

2. Apparatus for lubricating the rings and travelers in a twister frame or the like comprising the combination with a ring rail of a unitary sheet metal tray positioned below the same, the tray having upwardly extending side and end flanges and guard flanges extending upwardly into the rings, the floor of the tray and the said flanges defining a well for holding a supply of lubricant for lubricating a plurality of rings.

3. Apparatus for lubricating the rings and travelers in a twister frame or the like comprising the combination with a ring rail of a tray positioned below the same, the tray having upwardly extending side and end flanges and guard flanges extending upwardly into the rings, the floor of the tray and the said flanges defining a well for holding a supply of lubricant for lubricating a plurality of rings, the floor being generally flat but having annular depressions surrounding the guard flanges to deepen the well around the same.

4. Apparatus for lubricating the rings and travelers in a twister frame or the like comprising the combination with a ring rail of a tray positioned below the same, the tray having upwardly extending side and end flanges and guard flanges extending upwardly into the rings, the floor of the tray and the said flanges defining a well for holding a supply of lubricant for lubricating a plurality of rings, and the floor of the tray having transverse ridges for obstructing flow of lubricant along the tray.

5. Apparatus for lubricating the rings and travelers in a twister frame or the like comprising the combination with a ring rail of a tray positioned below the same, the tray having upwardly extending side and end flanges and guard flanges extending upwardly into the rings, the floor of the tray and the said flanges defining a well for holding a supply of lubricant for lubricating a plurality of rings, the floor being generally flat but having annular depressions surrounding the guard flanges to deepen the well around the same, and further depressions connecting pairs of the annular depressions to provide for flow of lubricant between the same.

6. Apparatus for lubricating the rings and travelers in a twister frame or the like comprising the combination with a ring rail of a tray positioned below the same, the tray having upwardly extending side and end flanges and guard flanges extending upwardly into the rings, the floor of the tray and the said flanges defining a well for holding a supply of lubricant for lubricating a plurality of rings, and the ring rail and tray forming a substantially closed housing.

FALLS L. THOMASON.

No references cited.